United States Patent
Horitgami et al.

(10) Patent No.: US 7,400,241 B2
(45) Date of Patent: Jul. 15, 2008

(54) MONITORING DEVICE, MONITORING METHOD, AND MONITORING SYSTEM

(75) Inventors: Keisuke Horitgami, Kawasaki (JP);
Yoshihiro Kimura, Kawasaki (JP);
Ikuko Tachibana, Yokohama (JP);
Toshiaki Hayashi, Kawasaki (JP);
Tomohiro Hikita, Kawasaki (JP);
Takashi Tanifuji, Naka-gun (JP);
Yasutaka Tanikawa, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 11/397,722

(22) Filed: Apr. 5, 2006

(65) Prior Publication Data
US 2007/0103287 A1 May 10, 2007

(30) Foreign Application Priority Data
Nov. 7, 2005 (JP) ............................. 2005-322262

(51) Int. Cl.
*G08B 29/00* (2006.01)
(52) U.S. Cl. .................. 340/506; 340/3.1; 340/5.1; 340/825.36; 340/825.49
(58) Field of Classification Search ............ 340/506, 340/3.1, 5.1, 825.36, 825.49; 709/220, 225
See application file for complete search history.

(56) References Cited

U.S. PATENT DOCUMENTS 7,158,488 B2 * 1/2007 Fujimori .................... 370/312

7,203,751 B2 * 4/2007 Yasushi et al. .............. 709/225

FOREIGN PATENT DOCUMENTS

JP          8-329006       12/1996
JP          2002-366683    12/2002

OTHER PUBLICATIONS

Office Action issued in corresponding Korean Patent Application No. 10-2006-0031236, on Aug. 8, 2007.

* cited by examiner

Primary Examiner—Daryl C Pope
(74) Attorney, Agent, or Firm—Staas & Halsey LLP

(57) ABSTRACT

The present invention provides a monitoring device configured to automatically associate devices forming a multifunctional device with support-contract information. A monitoring device configured to remotely monitor a device to be monitored connected to a network, the monitoring device including registration means which registers a group-identification information associated with an identification information of the device to be monitored, storing means which stores the support-contract information corresponding to the group-identification information, reception means which receives trouble-notification information transmitted from the device to be monitored, the trouble-notification information including the identification information related to the device-to-be-monitored, when a trouble occurs in the device to be monitored, acquisition means that acquires the group-identification information on the basis of a device-identification information of the received trouble-notification information and that acquires support-contract information from the acquired group-identification information, and display means that shows the acquired support-contract information and the trouble-notification information.

19 Claims, 12 Drawing Sheets

FIG.2A

| IDENTIFIER | SUPPORT CONTRACT INFORMATION |
|---|---|
| ID_A | SUPPORT CONTRACT INFORMATION A |
| ID_B | SUPPORT CONTRACT INFORMATION B |
| ID_C | SUPPORT CONTRACT INFORMATION C |
| ⋮ | ⋮ |
| ⋮ | ⋮ |

FIG.2B

| IDENTIFIER | INCIDENT INFORMATION |
|---|---|
| ID_A | INCIDENT INFORMATION A |
| ID_B | INCIDENT INFORMATION B |
| ID_C | INCIDENT INFORMATION C |
| ⋮ | ⋮ |
| ⋮ | ⋮ |

| DEVICE ID | FIRST IDENTIFIER (SUPORT CONTRACT GROUP) | SECOND IDENTIFIER (INCIDENT GROUP) |
|---|---|---|
| ID_A | ID_D | ID_D |
| ID_B | ID_D | ID_D |
| ID_C | ID_D | ID_D |

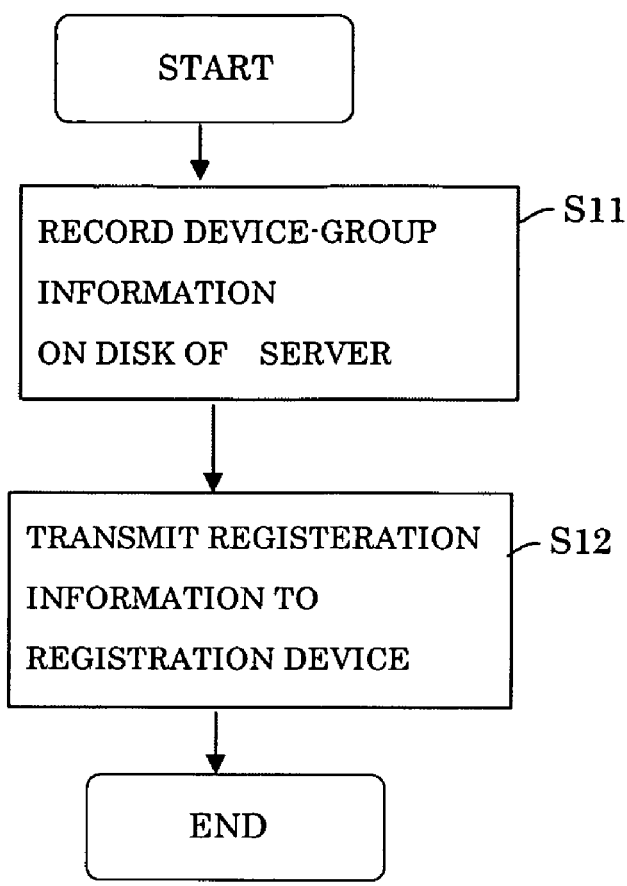

| DEVICE ID | FIRST IDENTIFIER (SUPORT CONTRACT GROUP) | SECOND IDENTIFIER (INCIDENT GROUP) |
|---|---|---|
| ID_A | ID_A | ID_C |
| ID_B | ID_B | ID_C |
| ID_C | ID_C | ID_C |

| DEVICE ID | FIRST IDENTIFIER (SUPORT CONTRACT GROUP) | SECOND IDENTIFIER (INCIDENT GROUP) |
|---|---|---|
| ID_A | ID_A | ID_A |
| ID_B | ID_A | ID_A |
| | | |

| DEVICE ID | FIRST IDENTIFIER (SUPORT CONTRACT GROUP) | SECOND IDENTIFIER (INCIDENT GROUP) |
|---|---|---|
|  |  |  |
| ID_A | ID_A |  |
|  |  |  |

| DEVICE ID | FIRST IDENTIFIER (SUPORT CONTRACT GROUP) | SECOND IDENTIFIER (INCIDENT GROUP) |
|---|---|---|
|  |  |  |
| ID_B | ID_A |  |
|  |  |  |

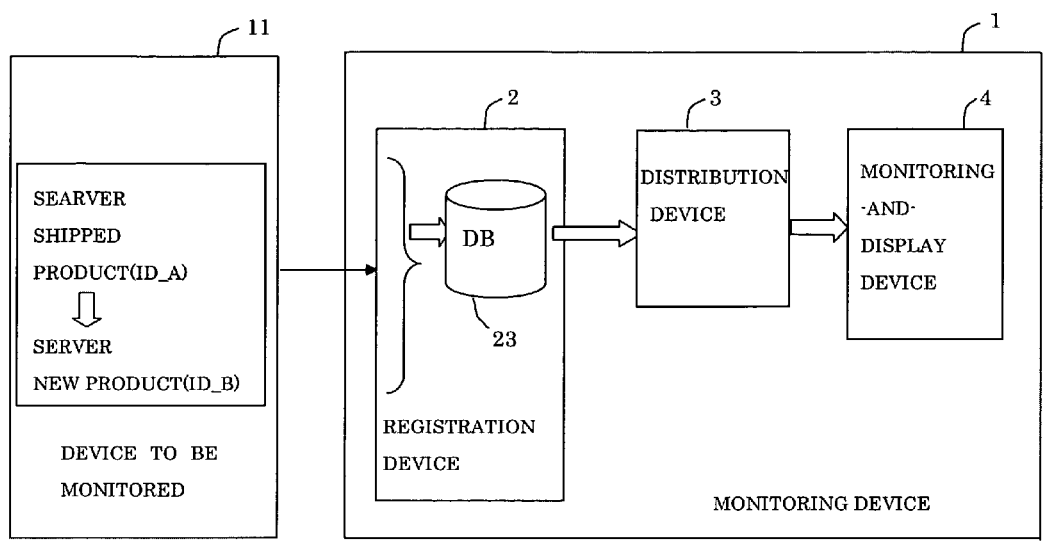

MONITORING DEVICE, MONITORING METHOD, AND MONITORING SYSTEM

BACKGROUND OF THE INVENTION

1. Field of the Invention

The present invention relates to a monitoring device, a monitoring method, and a monitoring system adapted to remotely control a device to be monitored connected to a network in a centralized manner.

2. Description of the Related Art

In recent years, products using shipped products including servers of a plurality of types, storage, and so forth in combination (hereinafter referred to as multifunctional devices) have been shipped.

Known monitoring systems include the multifunctional device functioning as a device to be monitored and a monitoring device including a center, a distribution device, and a monitoring-and-display device.

When a support contract for the multifunctional device is made, the devices forming the multifunctional device are often considered as a single device for which the support contract is made. On the other hand, each of the devices forming the multifunctional device, for example, the servers, a tape unit, the storage has a device-identification number.

Here, if troubles occur in individual devices forming the multifunctional device, the center is notified of trouble-notification information for each of the device-identification numbers corresponding to the devices in which troubles occur.

The center has no information relating to the multifunctional device to which the individual device that transmitted the trouble information belongs. Therefore, if a trouble occurs in the storage forming the multifunctional device, for example, the center transmits the notified trouble information of the device-identification information of the storage to the distribution device, as it is. The distribution device defines an identification number of each of the individual devices in association with information about the support contract, as a filter.

Then, if the filter of the distribution device is defined, maintenance information obtained by adding the support-contract information to the trouble-notification information is transmitted and shown on the monitoring-and-display device. Then, a system administrator performs client support on the basis of the details on the maintenance information.

On the other hand, if the filter definition is not made by the distribution device, only the trouble-notification information corresponding to the device-identification number of the storage is transmitted and shown on the monitoring-and-display device. Here, if a support contract for the multifunctional device with a client is made, it becomes possible to know the correspondence between the multifunctional device and the support-contract information. However, according to known technologies, it was impossible to know the correspondence between the individual devices forming the multifunctional device and the support-contract information provided for the multifunctional device. Therefore, the system administrator or a person in charge of maintenance on the monitoring-device side needs to check details on the support contract made for the device on the basis of the received trouble-notification information.

In that case, there is a need to generate new information obtained by associating the support-contract information with each of the devices forming the multifunctional device and register the new information with the distribution device. As a result, a large number of man-hours are required to confirm details on the support contract and register the support contract. Further, a mistake may occur while the details on the support contract are confirmed and/or the registration is performed.

Further, if troubles occur in the plurality of devices forming the multifunctional device when the multifunctional device is considered as a single device, it may be desirable that the troubles be addressed in association with one another. According to the known technologies, however, the trouble-notification information transmitted from the individual devices of the multifunctional device does not show that the multifunctional device is associated with the individual devices forming the multifunctional device. Therefore, when the trouble-notification information is transmitted from the individual devices, the monitoring device has to address many trouble occurrences, which may require a large number of man-hours for performing maintenance.

Thus, the above-described method requires a large number of man-hours, and causes human errors while establishing the support-contract-information associations, which affects support tasks.

An object of the present invention is to provide a monitoring device, a monitoring method, a monitoring system that automatically associate the devices forming the multifunctional device with information relating to maintenance such as the support-contract information of the multifunctional device.

Another object of the present invention is to provide a monitoring device, a monitoring method, and a monitoring system that compile unnecessary and overlapping maintenance information items, so as not to transmit the information items, when troubles occur in the devices forming the multifunctional devices due to the same reasons.

SUMMARY OF THE INVENTION

A monitoring device of the present invention is configured to remotely monitor a device to be monitored connected to a network. The monitoring device includes group-identification-number-registration means which registers a group-identification number associated with an identification number of the device to be monitored, support-contract-information-storing means which stores the support-contract information corresponding to the group-identification number, trouble-notification-information-reception means which receives trouble-notification information transmitted from the device to be monitored, the trouble-notification information including a device-to-be-monitored identification number, when a trouble occurs in the device to be monitored, support-contract-information-acquisition means that acquires the group-identification number on the basis of a device-identification number of the received trouble-notification information and that acquires support-contract information from the acquired group-identification number, and support-information-display means that shows the acquired support-contract information and the trouble-notification information.

According to the above-described configuration, the support-contract information can be acquired from the group-identification number acquired on the basis of the device-identification number of the device to be monitored. Subsequently, the person in charge of maintenance can understand what kind of maintenance should be performed without delay.

A monitoring device of the present invention is configured to remotely monitor a device to be monitored connected to a network. The monitoring device includes group-identification-number-registration means which registers a group-identification number associated with an identification number of the device to be monitored, trouble-notification-information-storing means which stores the trouble-notification information corresponding to the group-identification number, trouble-notification-information-reception means which receives the trouble-notification information transmitted from the device to be monitored, the trouble-notification information including a device-to-be-monitored identification number, when a trouble occurs in the device to be monitored, trouble-notification-information-acquisition means that acquires the group-identification number on the basis of a device-identification number of the received trouble-notification information and that acquires the trouble-notification information transmitted from the trouble-notification-information-storing means on the basis of the acquired group-identification number, trouble-notification-information comparison means which compares the acquired trouble-notification information with the received trouble-notification information, trouble-notification-information processing means which abandons the trouble-notification information received from the device to be monitored, when a result of the comparison indicates that the acquired trouble-notification information and the received trouble-notification information agree with each other, and stores the trouble-notification information received from the device to be monitored in the trouble-notification-information-storing means, when the acquired trouble-notification information and the received trouble-notification information do not agree with each other, and trouble-notification-information-display means which shows the stored trouble-notification information.

According to the above-described configuration, it becomes possible to acquire the trouble-notification information items from the group-identification number acquired on the basis of the device-identification number of the device to be monitored and collect the trouble-notification information items relating to the same troubles. Therefore, the person in charge of maintenance does not have to check the sameness of the troubles on an individual basis.

BRIEF DESCRIPTION OF THE DRAWINGS

FIGS. 2A and 2B illustrate support-contract information and incident information.

FIG. 4 is a flowchart of processing performed by a device to be monitored at the time where the on-site adjustment is performed.

FIGS. 12A and 12B illustrate the example where support is performed for a new product developed on the basis of a shipped product (fifth embodiment).

DESCRIPTION OF THE PREFERRED EMBODIMENTS

First Embodiment

Figure 1:
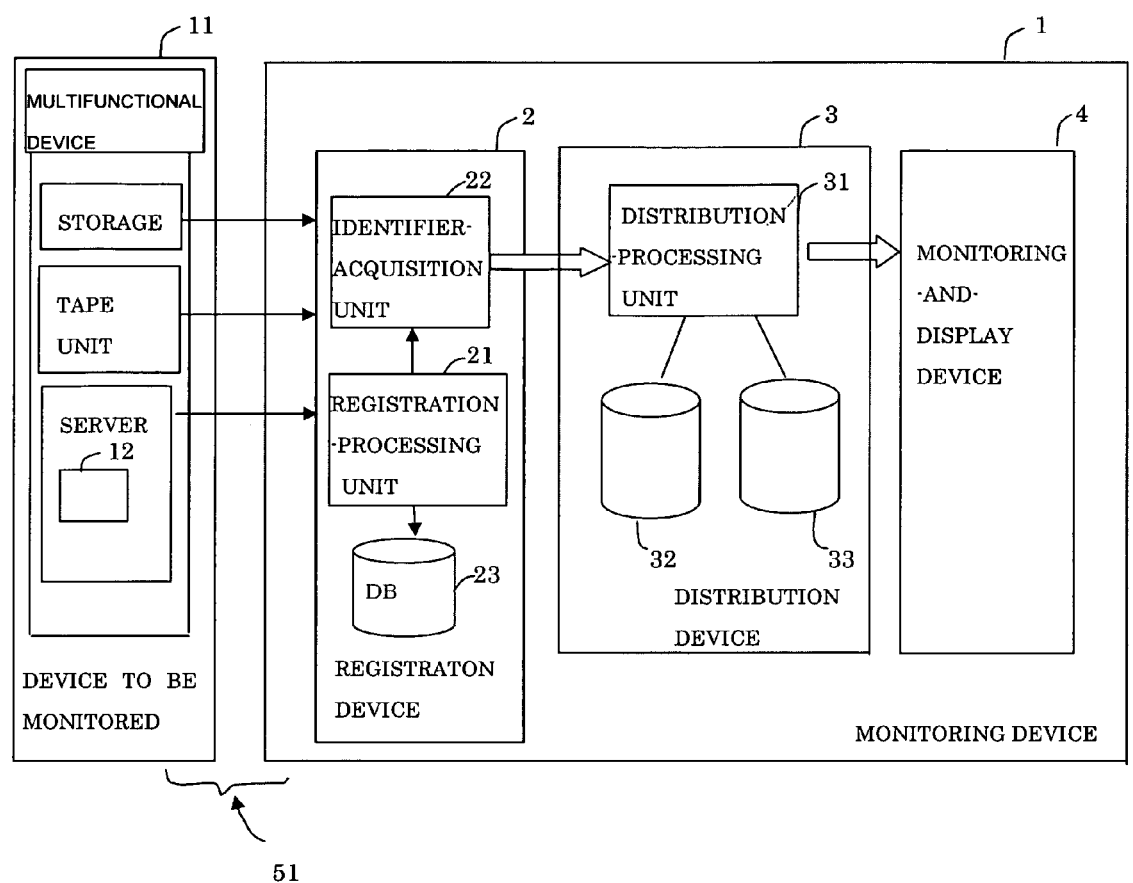
FIG. 1 shows the configurations of a monitoring system and a monitoring device (first embodiment).

FIG. 1 shows the configuration of a monitoring system and a monitoring device (a first embodiment).

A monitoring system 51 includes a device to be monitored 11 and a monitoring device 1.

The monitoring device 1 includes a registration device 2, a distribution device 3, and a monitoring-and-display device 4.

The device to be monitored 11 is a device that is remotely monitored and maintained by the monitoring device 1. In the first embodiment, the monitoring device 11 is a multifunctional device including a server, storage, a tape unit, and so forth.

A registration-information-setting unit 12 is provided in a representative device of the multifunctional device and stores registration information transmitted thereto. When the representative device of the multifunctional device is determined to be the server, the registration information-setting unit 12 is provided in the server and the transmitted registration information is recorded onto a disk of the server.

The registration information includes device-group information, customer information, and device information.

The device-group information includes a support-contract-group-identification number (the first identifier) and an incident-group-identification number (the second identifier) that are associated with a device-identification number (hereinafter referred to as a device ID) of each of the devices forming the device to be monitored 11. A support-contract group is the maintenance-contract group corresponding to each of the devices. Further, the incident group denotes a group of trouble-notification information items which occur in the devices.

The customer information indicates a company name, an address, and so forth of a customer. The device information includes information about a manufacturer, a product number, a version number, a device ID, and so forth.

The registration device 2 includes a registration-processing unit 21 and an identifier-acquisition unit 22. Under the assumption that an ordinary system is used, the registration device 2 corresponds to a so-called center.

The registration-processing unit 21 registers registration information transmitted from the device to be monitored 11 with a registration-information-storing unit 23 (hereinafter referred to as a DB 23) provided in the registration device 2. Further, the registration-processing unit 21 can also store registration information directly transmitted from an input unit or the like that is not shown and that is connected to the registration device 2 in the DB 23.

Upon receiving trouble-notification information including the device ID transmitted from the device to be monitored 11, the identifier-acquisition unit 22 searches the DB 23 for the device-group information and acquires an identifier indicating the device group corresponding to the device ID. Next, the identifier-acquisition unit 22 adds the acquired identifier information to the trouble-notification information and transmits the trouble-notification information to the distribution device 3, as trouble-event information.

The DB 23 is a disk or the like on which the registration information is recorded.

The distribution device 3 includes a distribution-processing unit 31, a support-contract-information-storing unit 32, and an incident-storing unit 33.

When the first identifier is included in the trouble-event information transmitted from the registration device 2, the distribution-processing unit 31 searches and extracts support-contract information stored in the support-contract-information-storing unit 32 on the basis of the first identifier.

When the first identifier is not added to the trouble-event information transmitted from the registration device 2, the distribution-processing unit 31 searches and extracts the support-contract information stored in the support-contract-information-storing unit 32 on the basis of the device ID added to the trouble-event information.

Further, the distribution-processing unit 31 collects incident-information items of the device to be monitored 11 according to the second identifier added to the trouble-event information. The incident-information items denote the trouble-notification information transmitted to the registration device 2, when troubles occur in the device to be monitored 11. Upon receiving trouble-event information items to which the same second identifiers are added in a predetermined time period, the distribution unit 31 collects and stores the trouble-event information items, as a single incident information item. That is to say, if the reports corresponding to troubles that occur due to the same reasons are transmitted from the different individual devices, the distribution device 31 handles the reports, as a single incident-information item.

After performing the above-described processing, the distribution-processing unit 31 transmits the support-contract information associated with the trouble-event information to the monitoring-and-display device 4, as maintenance information.

FIGS. 2A and 2B show illustrations of the support-contract information and the incident information.

The support-contract-information-storing unit 32 stores information obtained by associating the first identifier or the device ID with the support-contract information. For example, when the first identifier is shown as ID_A, support-contract information A is stored. Further, the support-contract-information-storing unit 32 stores information including the support-contract information associated with the device ID of the device to be monitored corresponding to no first-identifier information. For example, if the device ID of the device to be monitored corresponding to no first-identifier information is shown as ID_C, the support-contract-information storing unit 32 stores support-contract information C.

The support-contract information is information about the device ID, the device-installation position, details on a maintenance contract such as a spot contract and a yearly-maintenance contract, the name of a person in charge of maintenance, and so forth.

An incident-storing unit 33 stores information obtained by associating the second identifier with the incident information. For example, when the second identifier is shown as ID_A, incident information A is stored, corresponding to the second identifier.

Upon receiving the maintenance information transmitted from the distribution device 3, the monitoring-and-display device 4 shows the support-contract information and the trouble-notification information. For example, the contract descriptions or the like is shown, as the support-contract information, and the device ID of a device which performed trouble notification, the trouble-occurrence date and time, the trouble detailed information, and so forth are shown, for example, as the trouble-notification information.

By checking the details on display information shown by the monitoring-and-display device 4, a system administrator performs trouble determination and selection of a unit in which the trouble occurs, and sends the person in charge of maintenance according to the details on the support contract, so as to address the trouble.

Thus, for determining the device in which the trouble occurs and associating the device with the support-contract description thereof, the device-group information obtained by collecting a plurality of device IDs is used, in addition to a unique device ID assigned to a device at the time when the device is shipped from a factory, where the device IDs relate to the unique device ID. Subsequently, even though there is no support contract corresponding to a device which transmits the trouble-notification information, the distribution device 3 can acquire information about a support contract or the like from the device-group information of the multifunctional device corresponding to the device which reports the trouble-notification information so that it becomes possible to take measures such as maintenance on the basis of the acquired support-contract information. Further, even though the transmitted trouble-notification information items are transmitted from different devices, the distribution device 3 can integrate the trouble-notification information items transmitted from the devices into a single incident-information item on the basis of the device-group information of the multifunctional device, if the troubles are caused by the same reason.

Figures 3A, 3B:
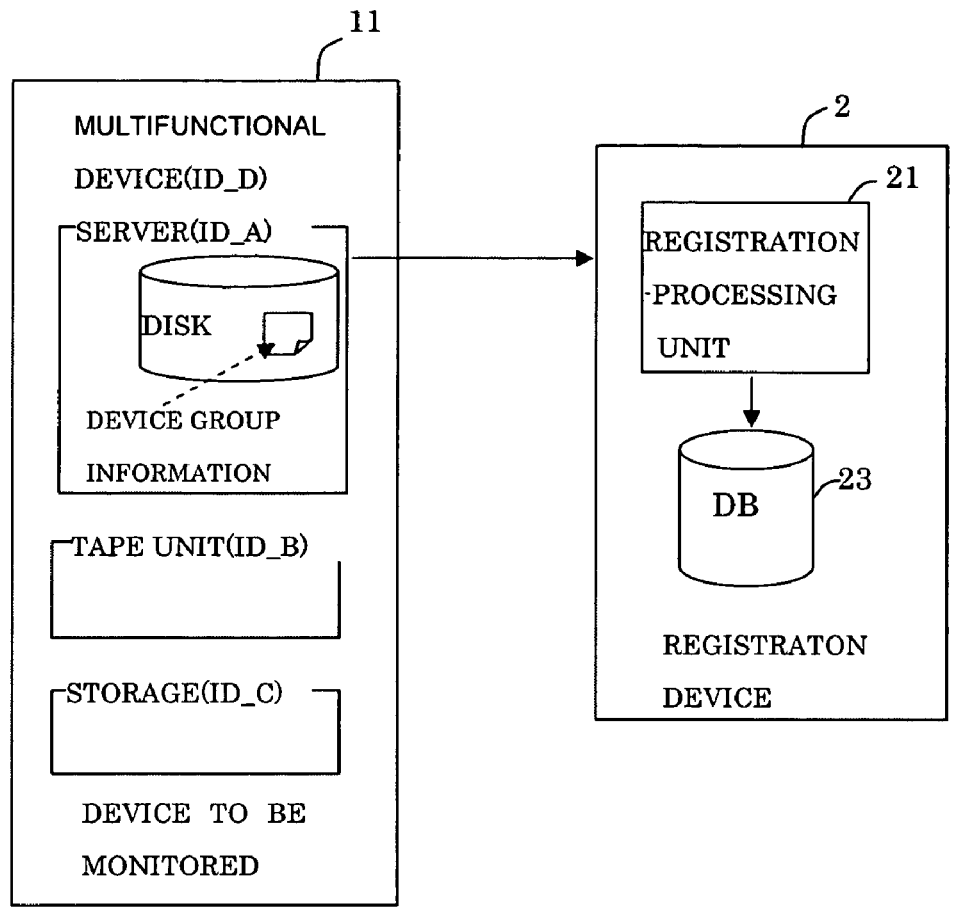
FIGS. 3A and 3B illustrate processing performed at the time where on-site adjustment is performed, so as to install a multifunctional device.

FIGS. 3A and 3B show illustrations of processing performed for achieving on-site adjustment when the multifunctional device is installed.

FIG. 3A shows an illustration of processing performed for achieving the on-site adjustment.

The outline of the processing performed for achieving the on-site adjustment is shown below. At the time where the on-site adjustment for the multifunctional device is performed, first, the device-group information is registered with the multifunctional device. Example settings on the device-group information are shown in FIG. 3B. The device-group information is stored in the representative device of the multifunctional device. In an example of FIG. 3A, the device-group information is recorded onto a disk of the server.

Further, the customer information and the device information are also recorded onto the disk of the server. After the above-described various information items are recorded onto the disk of the server, the registration information including the customer information, the device information, and the device-group information is transmitted from the server to the registration device 2. The registration device 2 registers the registration information transmitted from the server with the DB 23, as customer-management information. Here, the customer information indicates the company name, the address, and so forth of a customer. The device information includes information about a manufacturer, a product number, a version number, a device-identification number, and so forth.

FIG. 3B shows an illustration of the device-group information.

In association with the device IDs including ID_A, ID_B, and ID_C of the server, the tape unit, the storage that form the multifunctional device, the device-identification number ID_D of the multifunctional device is registered, as the first identifier of the support-contract group and the second identifier of the incident group.

FIG. 4 shows a flowchart of processing performed by the device to be monitored at the time where the on-site adjustment is performed.

First, at the time where the on-site adjustment is performed, registration information including device-group information about the multifunctional device, the customer information, and the device information of each of the devices is generated and recorded onto the representative device of the devices forming the multifunctional device, that is, the disk of the server in this embodiment (step S11).

Next, the generated registration information is transmitted to the registration device 2 (step S12).

Figure 5:
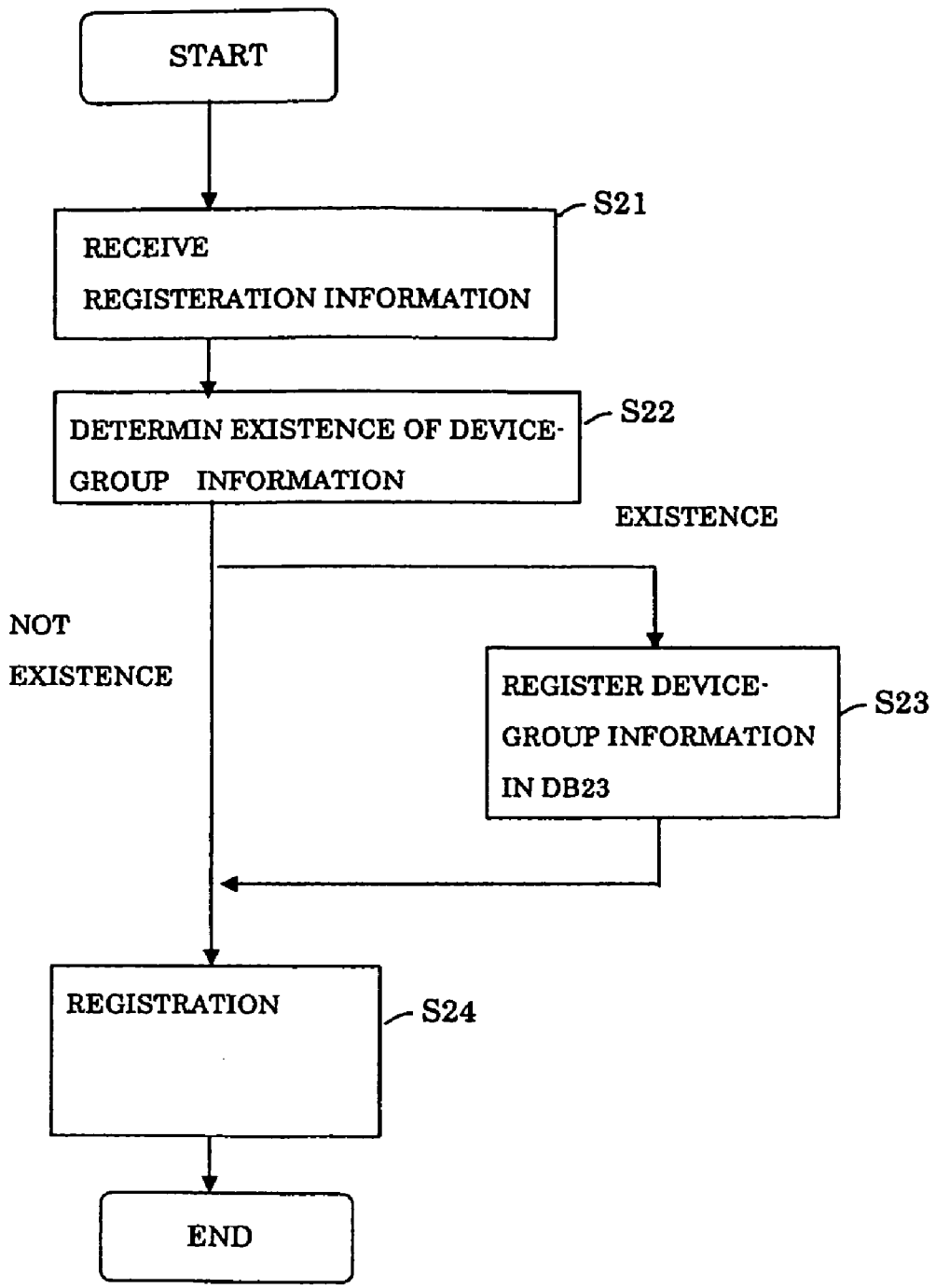
FIG. 5 is a flowchart of processing performed by a registration device at the time where the on-site adjustment is performed.

FIG. 5 shows a flowchart of processing performed by the registration device, at the time where the on-site adjustment is performed.

The registration device 2 receives the registration information transmitted from the device to be monitored 11 (step S21).

Next, the registration device 2 determines whether or not the device-group information exists in the transmitted registration information (step S22).

If the device-group information does not exist, the processing advances to step S24.

If the device-group information exists, the device-group information is registered with the DB 23 (step S23).

Next, the customer information and the device information other than the device-group information are registered (step S24).

Figure 6:
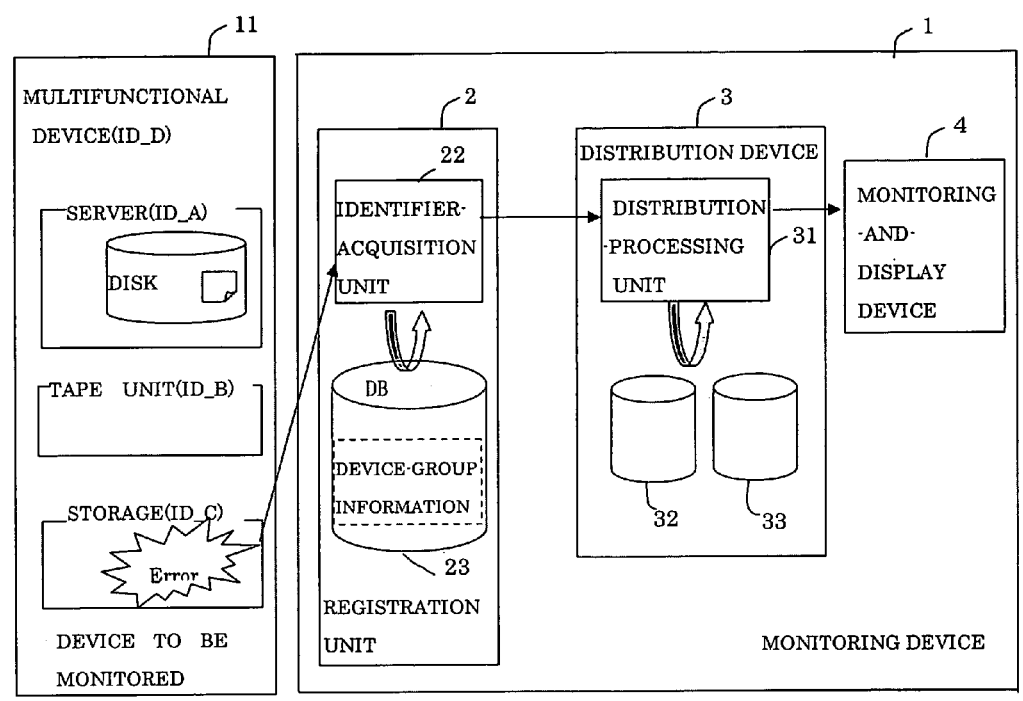
FIG. 6 illustrates processing performed when a trouble occurs in a device forming the multifunctional device.

FIG. 6 shows an illustration of processing performed when a trouble occurs in the device forming the multifunctional device.

FIG. 6 shows an example where a trouble occurs in the storage forming the multifunctional device.

The outline of the processing performed when the trouble occurs in the device forming the multifunctional device is shown below. When the trouble-notification information is transmitted from the storage (ID_C) which is monitored by the monitoring device to the registration device 2, an identifier-acquisition unit 22 of the registration device 2 searches the DB 23 for the device-group information and determines whether or not the registered device ID agrees with the device ID transmitted from the storage. If the device ID that agrees with ID_C which is the device ID transmitted from the storage is registered, the first identifier and the second identifier are extracted from the searched device-group information, added to the trouble-notification information, and transmitted to the distribution device 3, as the trouble-event information. Further, if the device ID that agrees with ID_C which is the device ID transmitted from the storage is not registered, the trouble-notification information transmitted from the storage is transmitted to the distribution device 3, as the trouble-even information. In that case, no identifier is added to the trouble-notification information.

The distribution device 3 determines whether or not the identifier is included in the trouble-even information transmitted from the registration device 2. If the first identifier is detected from the trouble-event information transmitted from the registration device 2, the distribution device 3 searches the support-contract-information-storing unit 32 on the basis of the first identifier and acquires the support-contract information associated with the detected identifier.

Further, when the distribution device 3 detects the second identifier from the trouble-event information transmitted from the registration device 2, the distribution device 3 searches the incident-storing unit 33 on the basis of the second identifier. If the incident-information items corresponding to the detected second identifier exist in the incident-storing unit 33, the distribution device 3 compiles the incident-information items. That is to say, the same incident-information items are compiled into a single information item and not registered, as new incident information.

Then, the compiled incident information is transmitted to the monitoring-and-display device 4, as the maintenance information with the support-contract information or the like.

The monitoring-and-display device 4 shows details on the information transmitted from the distribution device 3. The monitoring-and-display device 4 shows the support-contract information, the trouble-notification information, and so forth. For example, contract descriptions or the like are shown, as the support-contract information, and the device ID of the device that performed trouble notification, the trouble-occurrence date and time, the trouble detailed information, and so forth are shown, for example, as the trouble-notification information.

Figure 7:
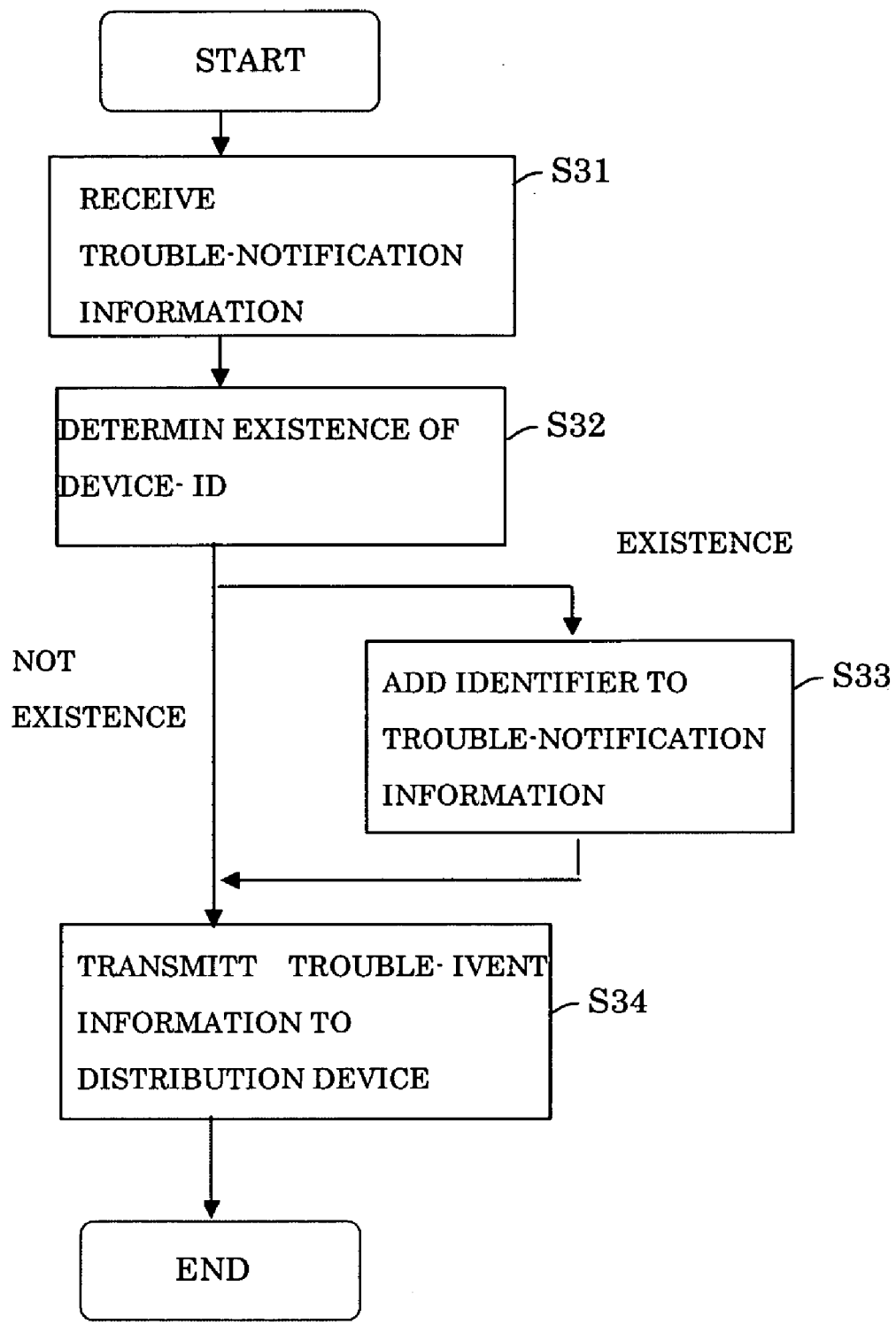
FIG. 7 is a flowchart of processing performed by the registration device at the time where the trouble occurs.

FIG. 7 shows a flowchart of processing performed by the registration device 2 at the time where a trouble occurs.

The registration device 2 receives the trouble-notification information transmitted from part of the devices forming the multifunctional device (step S31). In this embodiment, the registration device 2 receives the trouble-notification information transmitted from the storage.

The trouble-notification information transmitted from the registration device 2 includes the device ID of the device in which the trouble occurs, the trouble-occurrence date and time, the trouble detailed information, and so forth.

Next, the registration device 2 determines whether or not the device ID transmitted from the device in which the trouble occurs exists in the device-group information registered with the registration device 2 (step S32).

If the transmitted device ID exists in the device-group information, the first identifier and the second identifier that are included in the device-group information are added to the trouble-notification information (step S33).

If the transmitted device ID does not exist in the device-group information, the processing advances to step S34.

Next, the trouble-event information is transmitted from the registration device 2 to the distribution device 3. Here, if no identifier is acquired, only the trouble-notification information is transmitted, as the trouble-event information, and if the identifier is acquired, the trouble-notification information with identifier information added thereto is transmitted, as the trouble-event information (step S34).

Figure 8:
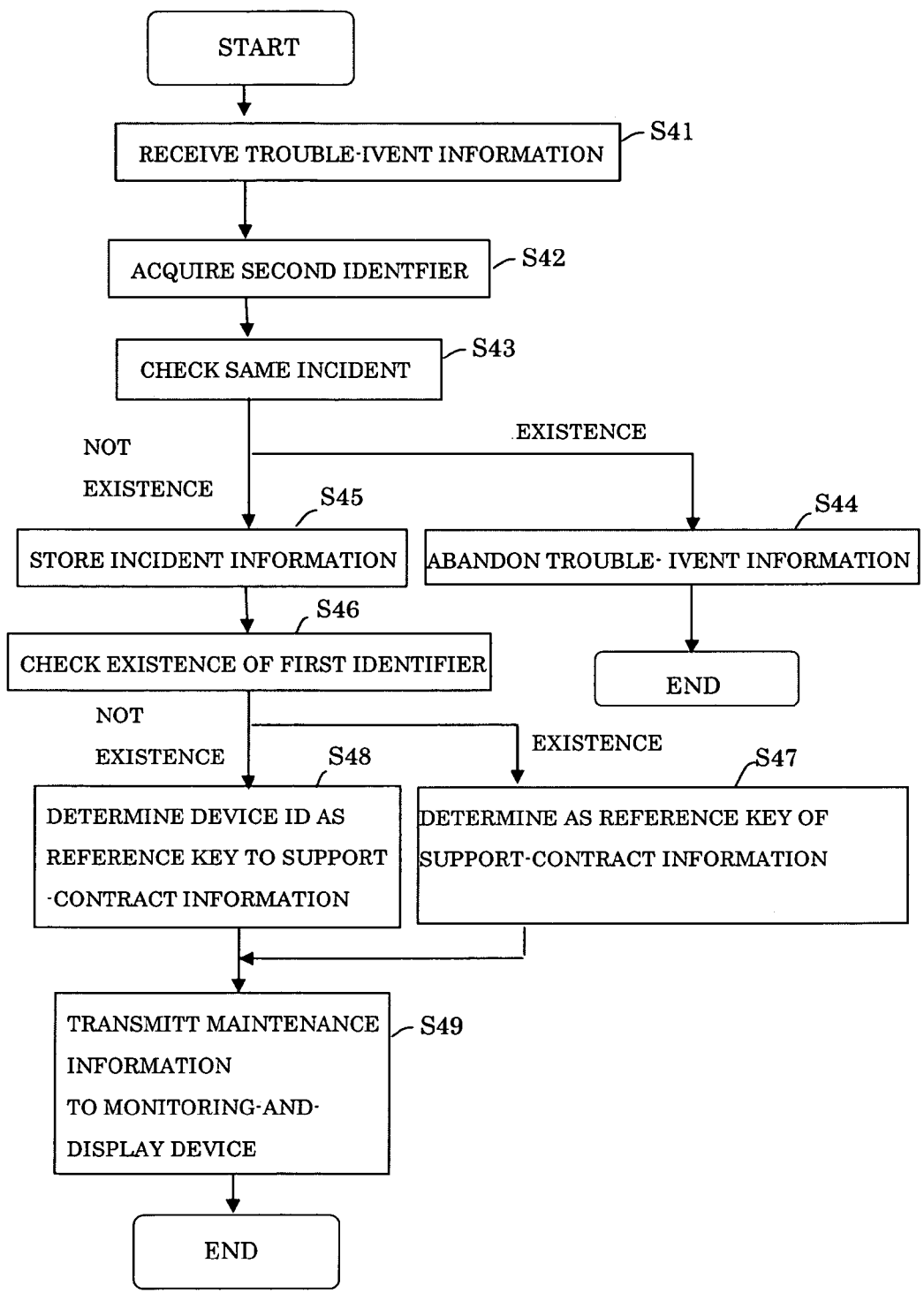
FIG. 8 is a flowchart of processing performed by a distribution device at the time where the trouble occurs.

FIG. 8 shows a flowchart of processing performed by the distribution device 3 at the time where a trouble occurs.

First, the distribution device 3 receives the trouble-event information transmitted from the registration device 2 (step S41).

Next, the distribution device 3 determines whether or not the second identifier is included in the trouble-event information transmitted from the registration device 2. If the second identifier is included, the distribution device 3 acquires the second identifier (step S42).

Next, the distribution device 3 searches the incident-storing unit 33 on the basis of the second identifier and determines whether or not the second identifier and the first identifier are stored in the incident-storing unit. If the same identifiers are stored, the distribution device 3 checks the sameness of incident-information items and checks whether or not incident conversion needs to be performed (step S43).

Then, if the same identifier as the transmitted identifier exists in the incident-storing unit, there is no need to convert the transmitted trouble-event information into an incident. Subsequently, the trouble-event information transmitted from the registration device 2 is cancelled (step S44).

For example, if a trouble occurs in the storage (ID_C), there may be cases where a trouble also occurs in a server (ID_A) which transmits and receives data to/from the storage. In such cases, the server notifies the monitor device 1 of the trouble. In that case, the trouble notified by the storage may be caused by the same reason as that of the trouble notified by the server. Therefore, the troubles which occur in the devices are collected, as a single trouble, and stored in the incident-storing unit 33.

Therefore, the distribution device 3 compares trouble-occurrence times included in the trouble-notification information transmitted from the devices and determines whether or not the trouble occurs in a predetermined time period. Further, by comparing details on the troubles included in the trouble-notification information, the distribution device 3 determines whether or not the troubles occurred in the devices are caused by the same reasons. Then, the distribution device 3 determines whether or not the troubles occurred in the devices should be compiled, as a single trouble on the basis of the determination result.

If the incident-storing unit 33 does not store incident information of which contents are the same as those of trouble information transmitted from the multifunctional device, the transmitted trouble information is converted into an incident and stored in the incident-storing unit 33 (step S45).

Here, the incident conversion denotes processing performed for associating the trouble-event information with the group-identification number corresponding thereto.

Next, it is checked whether or not the first identifier exists in the trouble-event information transmitted from the registration device 2 (step S46).

If the first identifier exists in the trouble-event information, the set value of the first identifier is determined to be a reference key of the support-contract information. Then, the distribution device 3 searches a support-contract-information-storing unit 32 on the basis of the first identifier and acquires the support-contract information corresponding to the first identifier (step S47).

On the other hand, when there is no first identifier in the trouble-even information, the device ID included in the trouble-event information is determined to be the reference key of the support-contract information. Then, the distribution device 3 searches the support-contract-information-storing unit and acquires the support-contract information corresponding to the device ID (step S48).

Next, the support-contract information searched on the basis of the reference key and the trouble-notification information or the like which is converted into an incident are transmitted to the monitoring-and-display device 4, as the maintenance information (step S49).

The monitoring-and-display device 4 shows the maintenance information transmitted from the distribution device 3.

Then, by seeing details on the maintenance information, the system administrator of the monitoring-and-display device 4 determines whether or not the details show that the person in charge of maintenance should be sent.

According to the above-described configuration, if trouble notification is transmitted from the individual devices forming the multifunctional device, it becomes possible to acquire information required for performing maintenance with efficiency, where the information includes, for example, the support-contract information relating to the multifunctional device to which the device belongs.

FIGS. 9A and 9B to 12 show other embodiments of the present invention.

Second Embodiment

Figures 9A, 9B:
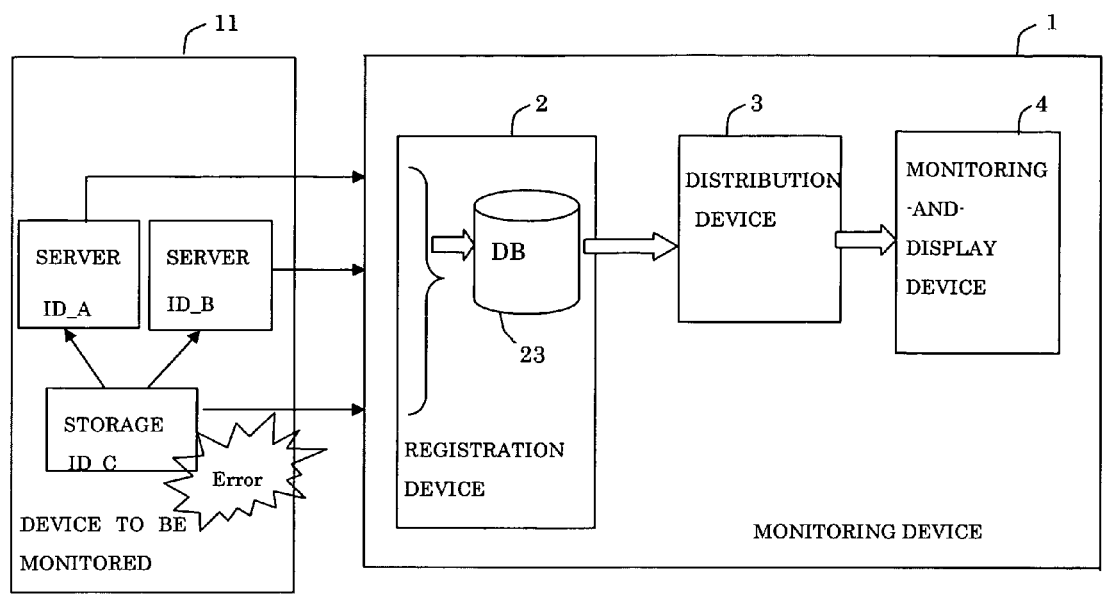
FIGS. 9A and 9B illustrate the example where a single storage unit is shared among a plurality of devices (second embodiment).

FIGS. 9A and 9B show illustrations of the case where a single storage unit is shared among a plurality of devices (second embodiment).

FIG. 9A shows an example system using the second embodiment. In a system shown in FIG. 8A, a single storage unit is shared by two servers.

When the single storage unit is shared among the plurality of devices, a support contract is made with each of the devices, as in the past.

In the case of FIG. 9A, the monitoring device 1 is often informed of a trouble that occurs in the storage included in the plurality of devices, as a trouble that occurs in the server. At that time, processing described below is performed so that redundant information does not occur in the monitoring device 1 which receives trouble-notification information transmitted from each of the storage and the server.

FIG. 9B shows device-group information of the second embodiment.

A device ID ID_A is set to a first server of servers included in the plurality of devices and a device ID ID_B is set to a second server of the servers included in the plurality of devices. On the other hand, device ID ID_C is set to the storage unit. In this embodiment, the device ID of each of the devices is set, as the first identifier indicating a support-contract group. More specifically, the first identifiers of the support-contract group corresponding to the device IDs (ID_A, ID_B, and ID_C) of the devices including two servers and a single storage unit are ID_A, ID_B, and ID_C.

On the other hand, the second identifier of an incident group is determined to be ID_C which is the device ID of the storage unit. The device ID ID_C is shared among the devices forming the device to be monitored.

As a result, as for the trouble-notification information transmitted from the storage unit whose device ID is ID_C, ID_C is set, as the first identifier of the storage unit. Therefore, the distribution device 3 searches and extracts the support-contract information on the basis of ID_C. Further, since ID_C is set, as the second identifier, incident information is searched on the basis of ID_C. If the incident information is not registered, the incident information is stored in the incident-storing unit 33 of the distribution device 3, as new incident information.

After that, if the trouble-notification information is transmitted from the first server of which device ID is ID_A, reference is made to information about the incident of the storage of which the device ID is ID_C, since the value of ID_C is set to the second identifier corresponding to the first server.

Further, it is determined whether or not the incident information item of the first server is identical to the incident information item of the storage according to information including the trouble-occurrence time, a report message, and so forth indicated by the trouble-notification information transmitted from the first server. Here, if the incident information item of the second identifier of the first server is determined to be identical to the incident information item of the storage, the incident information item transmitted from the first server is abandoned, as redundant information, whereby the incident information items are compiled into one information item.

Third Embodiment

Figures 10A, 10B:
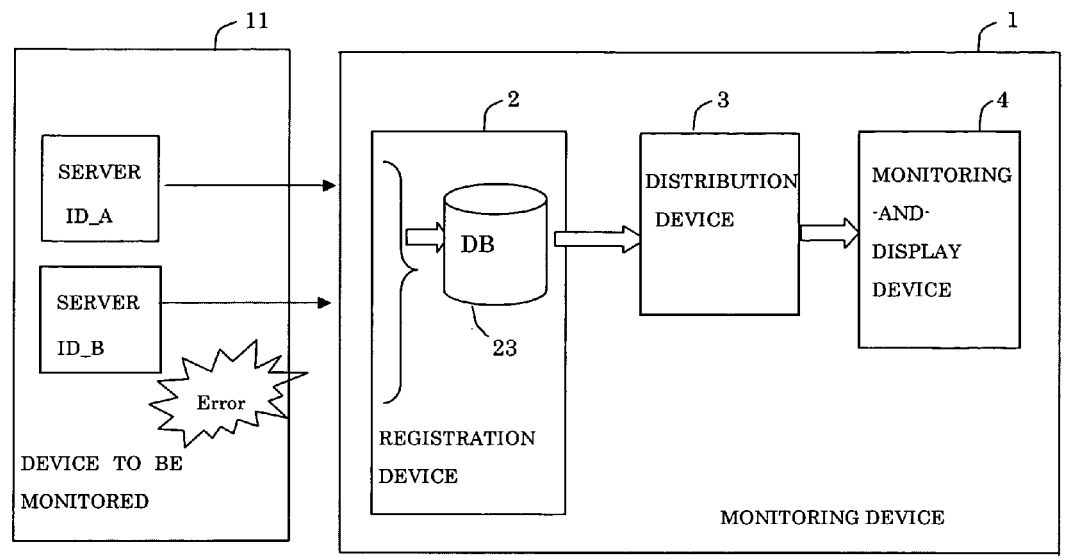
FIGS. 10A and 10B illustrate a multimodel using a plurality of the same devices, as a single device (third embodiment).

FIGS. 10A and 10B show illustrations of a multimodel using a plurality of same devices, as a single device (third embodiment)

FIG. 10A shows an example system using the third embodiment.

The system described in the third embodiment has a double-server device configuration, so as to increase the reliability thereof.

FIG. 10B indicates device-group information which is set in the third embodiment.

ID_A is assigned to the first server forming the system, as the device ID. On the other hand, ID_B is assigned to the second server, as the device ID. As the first identifier which identifies the support-contract group, ID_A is assigned to both the first server and the second server. On the other hand, as the second identifier which identifies the incident group, ID_A is assigned to both the first server and the second server.

The setting of the above-described identifiers is performed at the time where the on-site adjustment is performed for the system shown in FIG. 10A and the set first and second identifiers are transmitted to the registration device 2, as registration information.

If a trouble occurs in the server forming the system shown in FIG. 10A, trouble-notification information is transmitted from the server to the monitoring device. The registration device 2 searches the DB 23 on the basis of the device ID assigned to the transmitted trouble-notification information and determines whether or not the corresponding first and second identifiers are registered. The searched identifiers are transferred to the distribution device 3, as part of trouble-event information. The distribution device 3 refers to the support-contract-information-storing unit 32 and the incident-information-storing unit 33 by using the transmitted identifiers.

In this embodiment, ID_A is set, as the identifier of the support-contract group, as shown in FIG. 10B. Therefore, since ID_A is registered, as the first identifier corresponding to the second server, it becomes possible to acquire the support-contract information corresponding to the first server on the basis of the first identifier, even though the trouble-notification information is transmitted from the second server to which ID_B is assigned, as the device ID. Further, ID_A is registered, as the second identifier corresponding to the second server and a trouble which occurs in the second server and a trouble which occurs in the first server can be handled, as the same incident-information items. Therefore, if reports are generated by the first and second servers due to troubles of the same type, it becomes possible to determine whether or not the reports are redundant reports.

Fourth Embodiment

Figures 11A, 11B, 11C:
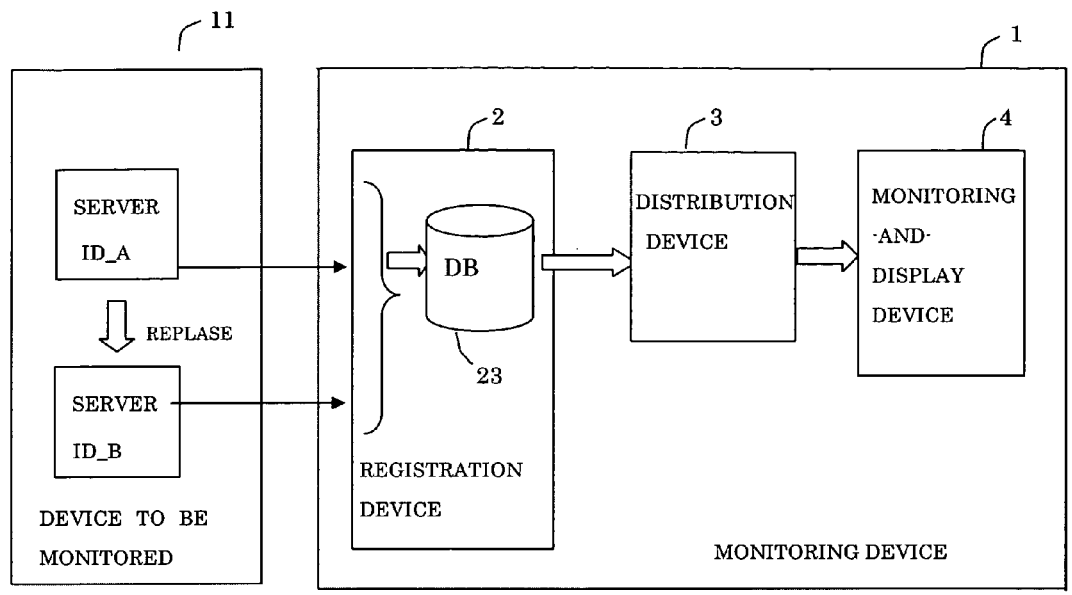
FIGS. 11A, 11B, and 11C illustrate the example where device replacement is performed, as maintenance (fourth embodiment).

FIGS. 11A, 11B, and 11B show illustrations of the case where device replacement is performed, as maintenance (a fourth embodiment).

FIG. 11A shows an example system of the fourth embodiment.

In this embodiment, the first server forming the device to be monitored 11 is replaced with the second server, for example. Further, in this embodiment, the assumption is made that a support contract made for the first server which is not yet replaced is taken over to the second server after the replacement is performed.

FIG. 11B shows device-group information obtained at the time where the replacement is not yet performed. FIG. 11C shows the device-group information obtained after the replacement is performed.

The device-group information obtained when the replacement is not yet performed is set, so as to correspond to the first server. ID_A is set, as the first identifier of the support-contract group, corresponding to the device ID ID_A of the first server. Further, the device to be monitored 11 of this embodiment is not the multifunctional device. That is to say, the device to be monitored 11 includes a single device, so that there is no need to collect trouble-information items transmitted from a plurality of devices, as a single incident group. Therefore, in this embodiment, the second identifier of the incident group is not assigned.

When the first server is replaced with the second server, the device-group information is updated.

As shown in FIG. 11C, the device-group information obtained after the replacement is performed is set, so as to correspond to the device ID ID_B of the second server. ID_A is set, as the first identifier indicating the support-contract group, as is the case with the first server.

Further, information is not set to the second identifier indicating the incident group.

The device-group information relating to the second server is set, at the time where the on-site adjustment is performed after the device replacement is performed, and transmitted to the registration device 2.

Here, the value of ID_A is also set, as the first identifier indicating the support-contract group for the second server, as shown in FIG. 11C. Therefore, if a trouble occurs in the second server, it becomes possible to associate the second server with the support-contract information corresponding to the first server by referring to the first identifier registered with the registration device 2.

Fifth Embodiment

FIGS. 12A and 12B show illustrations of the case where support is given to a new product developed on the basis of a shipped product (fifth embodiment).

For example, a product developed on the basis of the shipped product is shipped, as a new OEM product.

FIG. 12A shows an example system using this embodiment.

For example, the device number of the new product developed on the basis of the shipped product of which device number is ID_A is determined to be ID_B.

FIG. 12B shows device-group information.

The first identifier of the support-contract group having device-identification number ID_A is ID_B.

On the other hand, since the device to be monitored 11 of this embodiment is not the multifunctional device, the second identifier of the incident group is not assigned.

At the time where the on-site adjustment is performed, a device ID_B of the new product developed on the basis of a shipped product device ID_A is set, as the first identifier and registration information is transmitted to the registration device 2. Since the value of the device ID_B is included in the first identifier, the incident information of the device ID_A can be associated with support-contract information.

Further, according to the system configuration of the monitoring device 1, devices including the registration device 2, the distribution device 3, and the monitoring-and-display device 4 may be provided, at different positions on a network.

As has been described, when a trouble occurs in the device to be monitored 11 forming the multifunctional device, the present invention allows for acquiring a support contract for the multifunctional device with speed. Further, when the troubles occur in the device to be monitored 11, it becomes possible to collect the same trouble-information items transmitted from the devices of the multifunctional device, which reduces activities performed for separating trouble-information items.

Further, the same advantages as those of the above-described embodiments can be obtained by extensively using the present invention for a device which is not the multifunctional device.

What is claimed is:

1. A monitoring device configured to remotely monitor a device to be monitored connected to a network, the monitoring device comprising:
   registration means for registering a group-identification information associated with an identification information of the device to be monitored;
   storing means for storing support-contract information corresponding to the group-identification information;
   reception means for receiving trouble-notification information transmitted from the device to be monitored, the trouble-notification information including the identification information related to the device-to-be-monitored upon occurrence of a trouble in the device to be monitored;
   acquisition means for acquiring the group-identification information on the basis of a device-identification information of the received trouble-notification information, acquiring support-contract information from the acquired group-identification information; and
   display means for showing the acquired support-contract information and the trouble-notification information.

2. The monitoring device according to claim 1, wherein the registration means registers the group-identification information of a multifunctional device including a plurality of the devices to be monitored, as components, in association with the components.

3. The monitoring device according to claim 1, wherein the registration means receives and registers the group-identification information transmitted from the device to be monitored, the group-identification information being associated with the identification information of the device to be monitored.

4. The monitoring device according to claim 1, wherein the registration means registers an identification information of a representative device of a multifunctional device including a plurality of the devices to be monitored, as components, as the group-identification information.

5. The monitoring device according to claim 1, wherein the registration means stores the device-identification information that is used before maintenance replacement is performed, as the group-identification information corresponding to the device-identification information that is used after the maintenance replacement is performed.

6. The monitoring device according to claim 1, wherein the registration means determines the identification information of the device to be monitored, as the device-identification information of a shipped product, and stores the device-identification information of a new product developed on the basis of the shipped product, as the group-identification information.

7. A monitoring device configured to remotely monitor a device to be monitored connected to a network, the monitoring device comprising:
   registration means for registering a group-identification information associated with an identification information of the device to be monitored;
   storing means for storing the trouble-notification information corresponding to the group-identification information;
   reception means for receiving the trouble-notification information transmitted from the device to be monitored, the trouble-notification information including the identification information related to the device-to-be-monitored upon occurrence of a trouble in the device to be monitored;
   acquisition means for acquiring the group-identification information on the basis of a device-identification information of the received trouble-notification information, acquiring the trouble-notification information transmitted from the storing means on the basis of the acquired group-identification information;
   comparison means for comparing the acquired trouble-notification information with the received trouble-notification information;
   processing means for abandoning the trouble-notification information received from the device to be monitored, when a result of the comparison indicates that the acquired trouble-notification information and the received trouble-notification information agree with each other, storing the trouble-notification information received from the device to be monitored in the storing means, when the acquired trouble-notification information and the received trouble-notification information do not agree with each other; and
   display means for showing the stored trouble-notification information.

8. The monitoring device according to claim 7, wherein the registration means registers the group-identification information of a multifunctional device including a plurality of the devices to be monitored, as components, in association with the components.

9. The monitoring device according to claim 7, wherein the registration means receives and registers the group-identification information transmitted from the device to be monitored, the group-identification information being associated with the identification information of the device to be monitored.

10. The monitoring device according to claim 7, wherein the registration means registers an identification information of a representative device of a multifunctional device including a plurality of the devices to be monitored, as components, as the group-identification information.

11. A monitoring device configured to remotely monitor a device to be monitored connected to a network, the monitoring device comprising:
    registration means for registering a group-identification information associated with an identification information of the device to be monitored;
    support-contract-information storing means for storing support-contract information corresponding to the group-identification information;
    trouble-notification-information-storing means for storing the trouble-notification information corresponding to the group-identification information;
    reception means for receiving the trouble-notification information transmitted from the device to be monitored, the trouble-notification information including the identification information related to the device-to-be-monitored upon occurrence of a trouble in the device to be monitored;
    support-contract-information-acquisition means for acquiring the group-identification information on the basis of a device-identification information of the received trouble-notification information, acquiring support-contract information from the acquired group-identification information;
    trouble-notification-information-acquisition means for acquiring the group-identification information on the basis of the device-identification information of the received trouble-notification information, acquiring the trouble-notification information transmitted from the trouble-notification-information-storing means on the basis of the acquired group-identification information;

comparison means for comparing the acquired trouble-notification information with the received trouble-notification information;

processing means for abandoning the trouble-notification information received from the device to be monitored, when a result of the comparison indicates that the acquired trouble-notification information and the received trouble-notification information agree with each other, storing the trouble-notification information received from the device to be monitored in the trouble-notification-information-storing means, when the acquired trouble-notification information and the received trouble-notification information do not agree with each other; and display means for showing the acquired support-contract information and the stored trouble-notification information.

12. The monitoring device according to claim 11, wherein the registration means registers the group-identification information of a multifunctional device including a plurality of the devices to be monitored, as components, in association with the components.

13. The monitoring device according to claim 11, wherein the registration means receives and registers the group-identification information transmitted from the device to be monitored, the group-identification information being associated with the identification information of the device to be monitored.

14. A monitoring system including a plurality of devices to be monitored connected to a network and a monitoring device which remotely monitors the devices to be monitored, comprising:

the device to be monitored, including input means for inputting a group-identification information associated with an identification information of the device to be monitored, identification-information-storing means for storing the input group-identification information, identification-information-transmission means for transmitting the stored group-identification information to the monitoring device, and trouble-notification-information-transmission means which transmits trouble-notification information to the monitoring device upon occurrence of a trouble; and the monitoring device, including registration means for registering a group-identification information associated with an identification information of the device to be monitored, support-contract-information-storing means for storing support-contract information corresponding to the group-identification information, reception means for receiving trouble-notification information transmitted from the device to be monitored, the trouble-notification information including the identification information related to the device-to-be-monitored upon occurrence of a trouble in the device to be monitored, acquisition means for acquiring the group-identification information on the basis of a device-identification information of the received trouble-notification information, acquiring support-contract information from the acquired group-identification information, and display means for showing the acquired support-contract information and the trouble-notification information.

15. A monitoring system including a plurality of devices to be monitored connected to a network and a monitoring device which remotely monitors the devices to be monitored, comprising:

the device to be monitored, including input means for inputting a group-identification information used for making a support contract, the group-identification information being associated with an identification information of the device to be monitored, and a group-identification information provided for trouble-notification information, the group-identification information being associated with the identification information of the device to be monitored, identification-information-storing means for storing the input identification information, identification-information-transmission means for transmitting the stored identification information to the monitoring device, trouble-notification-information-transmission means for transmitting the trouble-notification information to the monitoring device upon occurrence of a trouble; and the monitoring device, including registration means for registering the group-identification information associated with the identification information of the device to be monitored, trouble-notification-information-storing means for storing the trouble-notification information corresponding to the group-identification information, reception means for receiving the trouble-notification information transmitted from the device to be monitored, the trouble-notification information including the identification information related to the device-to-be-monitored upon occurrence of a trouble in the device to be monitored, acquisition means for acquiring the group-identification information on the basis of the device-identification information of the received trouble-notification information, acquiring the trouble-notification information transmitted from the trouble-notification-information-storing means on the basis of the acquired group-identification information, comparison means for comparing the acquired trouble-notification information with the received trouble-notification information, processing means for abandoning the trouble-notification information received from the device to be monitored, when a result of the comparison indicates that the acquired trouble-notification information and the received trouble-notification information agree with each other, storing the trouble-notification information received from the device to be monitored in the trouble-notification-information-storing means, when the acquired trouble-notification information and the received trouble-notification information do not agree with each other, and display means for showing the stored trouble-notification information.

16. A monitoring system including a plurality of devices to be monitored connected to a network and a monitoring device which remotely monitors the devices to be monitored, comprising:

the device to be monitored, including input means for inputting a group-identification information associated with an identification information of the device to be monitored, identification-information-storing means for storing the input group-identification information, identification-information-transmission means for transmitting the stored group-identification information to the monitoring device, trouble-notification-information-transmission means for transmitting trouble-notification information to the monitoring device upon occurrence of a trouble; and the monitoring device, including registration means for registering the group-identification information associated with the identification information of the device to be monitored, support-contract-information-storing means for storing support-contract information corresponding to the group-identification information, trouble-notification-information-storing means for storing the trouble-notification information corresponding to the group-identification information, reception means for receiving the trouble-notification information transmitted from the device to be monitored, the trouble-notification information including the identification information related to the device-to-be-monitored upon occurrence of a trouble in the device to be monitored, support-contract-information-acquisition means for acquiring the group-identification information on the basis of a device-identification information of the received trouble-notification information, acquiring support-contract information from the acquired group-identification information, trouble-notification-information-acquisition means for acquiring the group-identification information on the basis of the device-identification information of the received trouble-notification information, acquiring the trouble-notification information transmitted from the trouble-notification-information-storing means on the basis of the acquired group-identification information, comparison means for comparing the acquired trouble-notification information with the received trouble-notification information, processing means for abandoning the trouble-notification information received from the device to be monitored, when a result of the comparison indicates that the acquired trouble-notification information and the received trouble-notification information agree with each other, storing the trouble-notification information received from the device to be monitored in the trouble-notification-information-storing means, when the acquired trouble-notification information and the received trouble-notification information do not agree with each other, and display means for showing the acquired support-contract information and the stored trouble-notification information.

17. A monitoring method adapted to remotely monitor a device to be monitored connected to a network, the monitoring method comprising:

a registration step for registering a group-identification information associated with an identification information of the device to be monitored with registration means;

a storing step for storing support-contract information corresponding to the group-identification information in storing means;

a reception step for receiving trouble-notification information transmitted from the device to be monitored, the trouble-notification information including the identification information related to the device-to-be-monitored upon occurrence of a trouble in the device to be monitored;

a acquisition step for acquiring the group-identification information on the basis of a device-identification information of the received trouble-notification information, acquiring support-contract information from the acquired group-identification information; and a display step for showing the acquired support-contract information and the trouble-notification information.

18. A monitoring method adapted to remotely monitor a device to be monitored connected to a network, the monitoring method comprising:

a registration step for registering a group-identification information associated with an identification information of the device to be monitored with registration means;

a storing step for storing the trouble-notification information corresponding to the group-identification information to storing means;

a reception step for receiving trouble-notification information transmitted from the device to be monitored, the trouble-notification information including the identification information related to the device-to-be-monitored upon occurrence of a trouble in the device to be monitored;

a acquisition step for acquiring the group-identification information on the basis of a device-identification information of the received trouble-notification information, acquiring the trouble-notification information transmitted from the storing means for storing the trouble-notification information corresponding to the group-identification information on the basis of the acquired group-identification information;

a comparison step for comparing the acquired trouble-notification information with the received trouble-notification information;

a processing step for abandoning the trouble-notification information received from the device to be monitored, when a result of the comparison indicates that the acquired trouble-notification information and the received trouble-notification information agree with each other, storing the trouble-notification information received from the device to be monitored in the storing means, when the acquired trouble-notification information and the received trouble-notification information do not agree with each other; and a display step for showing the stored trouble-notification information.

19. A monitoring method adapted to remotely monitor a device to be monitored connected to a network, the monitoring method comprising:

a registration step for registering a group-identification information associated with an identification information of the device to be monitored with registration means;

a support-contract-information-storing step for storing the support-contract information corresponding to the group-identification information in support-contract-information-storing storing means;

a trouble-notification-information-storing step for storing the trouble-notification information corresponding to the group-identification information to trouble-notification-information-storing means;

reception step for receiving trouble-notification information transmitted from the device to be monitored, the trouble-notification information including the identification information related to the device-to-be-monitored upon occurrence of a trouble in the device to be monitored;

a support-contract-information-acquisition step for acquiring the group-identification information on the basis of a device-identification information of the received trouble-notification information and acquiring the support-contract information from the acquired group-identification information;

a trouble-notification-information-acquisition step for acquiring the group-identification information on the basis of a device-identification information of the received trouble-notification information, acquiring the trouble-notification information transmitted from the trouble-notification-information-storing means for storing the trouble-notification information corresponding to the group-identification information on the basis of the acquired group-identification information;

a comparison step for comparing the acquired trouble-notification information with the received trouble-notification information;

a processing step for abandoning the trouble-notification information received from the device to be monitored, when a result of the comparison indicates that the acquired trouble-notification information and the received trouble-notification information agree with each other, storing the trouble-notification information received from the device to be monitored in the trouble-notification-information storing means, when the acquired trouble-notification information and the received trouble-notification information do not agree with each other; and a display step for showing the acquired support-contract information and the stored trouble-notification information.

* * * * *

UNITED STATES PATENT AND TRADEMARK OFFICE
CERTIFICATE OF CORRECTION

PATENT NO. : 7,400,241 B2 Page 1 of 1
APPLICATION NO. : 11/397722
DATED : July 15, 2008
INVENTOR(S) : Keisuke Horigami et al.

It is certified that error appears in the above-identified patent and that said Letters Patent is hereby corrected as shown below:

On the Title Page, Item (75) (Inventors), Line 1, change "Horitgami," to --Horigami,--.

Column 18, Line 60, before "means;" delete "storing".

Signed and Sealed this

Twenty-fifth Day of November, 2008

JON W. DUDAS
*Director of the United States Patent and Trademark Office*